United States Patent
Watkins

(10) Patent No.: US 7,523,961 B2
(45) Date of Patent: Apr. 28, 2009

(54) TRUCK BED BALLAST SYSTEM

(76) Inventor: Travis R. Watkins, 635 Zephyr Way, Westfield, IN (US) 46074

( * ) Notice: Subject to any disclaimer, the term of this patent is extended or adjusted under 35 U.S.C. 154(b) by 10 days.

(21) Appl. No.: 11/423,285

(22) Filed: Jun. 9, 2006

(65) Prior Publication Data
US 2007/0284865 A1 Dec. 13, 2007

(51) Int. Cl.
B60S 9/00 (2006.01)
(52) U.S. Cl. ...................... 280/759; 280/757
(58) Field of Classification Search ............... 280/757, 280/758, 759; 224/402, 403, 404; 296/37.6, 296/39.2; 212/178, 195
See application file for complete search history.

(56) References Cited

U.S. PATENT DOCUMENTS

| | | | |
|---|---|---|---|
| 1,888,006 A | * | 11/1932 | Marryatt et al. ............ 291/28 |
| 2,621,060 A | | 12/1952 | Sigurd |
| 2,865,419 A | * | 12/1958 | Cunningham ............ 383/109 |
| 2,993,721 A | | 7/1961 | Bowman |
| 3,156,492 A | | 11/1964 | Murray |
| 4,068,876 A | | 1/1978 | Muellner |
| 4,153,089 A | | 5/1979 | Veilleux |
| 4,190,281 A | | 2/1980 | Chandler |
| 4,339,142 A | | 7/1982 | Tanner et al. |
| 4,482,169 A | | 11/1984 | Yim |
| 4,688,823 A | | 8/1987 | Hanses |
| 4,737,056 A | * | 4/1988 | Hunt ....................... 410/151 |
| 4,796,914 A | | 1/1989 | Raynor |
| 4,971,356 A | | 11/1990 | Cook |
| 5,265,385 A | * | 11/1993 | Smith et al. ............... 52/79.5 |
| 5,265,553 A | * | 11/1993 | Brydges ............... 114/230.22 |
| 5,330,227 A | | 7/1994 | Anderson |
| 5,494,315 A | | 2/1996 | Heltenburg |

(Continued)

FOREIGN PATENT DOCUMENTS

EP 0820417 A1 1/1998

(Continued)

OTHER PUBLICATIONS

DIY Network: From: "Home Theater" Acoustic Treatments, episode DHTW—104.

(Continued)

Primary Examiner—Eric Culbreth
(74) Attorney, Agent, or Firm—C. John Brannon; Brannon & Associates PC

(57) ABSTRACT

A truck bed ballast system for providing incremental amounts of extra weight over the rear drive wheels of a pick-up truck that doubles as a storage container for traction-enhancing media, such as salt, sand, gravel, and the like. One example of the truck bed ballast system comprises at least one elongated cylindrical body member that is permanently capped at one end and may either be permanently capped or removably and resealably capped at the other end. At least one cylindrical body member is positioned in the bed of a pickup truck that is expected to need extra traction (such as in icy weather) between the rear wheel wells and the tailgate. If the truck were to lose traction and become stuck, despite the presence of the extra ballast weight, one or more cylindrical body members may be removed from the truck bed and their contents applied under the drive wheels to enhance traction and allow the truck to become unstuck.

11 Claims, 7 Drawing Sheets

U.S. PATENT DOCUMENTS

| | | |
|---|---|---|
| 5,582,441 A | 12/1996 | Frost |
| D377,475 S * | 1/1997 | Bowen ..................... D12/414 |
| 5,657,916 A | 8/1997 | Tackett |
| 5,752,601 A | 5/1998 | Arthur |
| 5,779,289 A | 7/1998 | Alexander, Jr. |
| 5,897,138 A | 4/1999 | Hall |
| 5,941,565 A | 8/1999 | Clendenin, Jr. |
| 6,027,139 A | 2/2000 | Malinowski, Jr. |
| 6,079,741 A | 6/2000 | Maver |
| 6,283,527 B1 | 9/2001 | Desmarais |
| 6,302,464 B1 | 10/2001 | Kubis |
| 6,371,532 B1 | 4/2002 | Skarie |
| 6,742,825 B1 * | 6/2004 | Macaulay ................. 296/37.6 |
| 6,827,533 B2 * | 12/2004 | Cano-Rodriguez et al. .. 410/128 |
| 2002/0101069 A1 | 8/2002 | Dombey |

FOREIGN PATENT DOCUMENTS

EP  0820417  6/2001

OTHER PUBLICATIONS

DIY Tube Traps, published by John Gale on Feb. 15, 2003.

* cited by examiner

TRUCK BED BALLAST SYSTEM

TECHNICAL FIELD OF THE INVENTION

This invention relates generally to a truck bed ballast system and, more particularly, to a device for providing incremental amounts of extra weight over the rear drive wheels of a pick-up truck that doubles as a storage container for traction-enhancing media, such as salt, sand and/or gravel.

BACKGROUND

Vehicles designed for carrying cargo, such as the standard pick-up truck, are engineered for optimum handling when loaded to capacity. Unfortunately, traction and handling problems can occur as the result of insufficient weight over the vehicle's rear power-driven wheels. During the winter months, ice, snow and generally slick conditions compound this problem. The resulting loss of traction can cause accidents with injury and damage. Further, starting from either a slippery surface or deep snow with little traction can often be difficult or impossible.

In response, weight bearing substitutes have been used to improve vehicle performance when not loaded with cargo. Many vehicle owners have responded to the problem by using sandbags, bricks or other bulky materials to weigh down cargo areas. These methods, however, while providing the necessary weight for improved traction, take up valuable cargo space and tend to shift weight as they move around the cargo area. Further, bagged material tends to leak as the bags wear, and the bags themselves may become waterlogged making it difficult to remove the material. With certain materials such as salt, water dissolves the material creating a solution which is detrimental to the truck bed. Moreover, loose material can fall out or become dangerous projectiles in the event of a sudden stop or accident.

There is thus a need for a truck bed ballast that provides incremental amounts of extra weight over the rear drive wheels of a pick-up truck and doubles as a storage container for traction-enhancing media, such as salt, sand and/or gravel. There is also a need for a ballast system that protects filler material from the elements. The present truck bed ballast system addresses these needs.

SUMMARY

The following is not in any way to limit, define or otherwise establish the scope of legal protection. In general terms, the present invention relates to a truck bed ballast system. One object is to provide a device for providing incremental amounts of extra weight over the rear drive wheels of a pick-up truck. Further objects, embodiments, forms, benefits, aspects, features and advantages of the present invention may be obtained from the description, drawings and claims provided herein.

DESCRIPTION OF THE PREFERRED EMBODIMENTS

Figure 1:
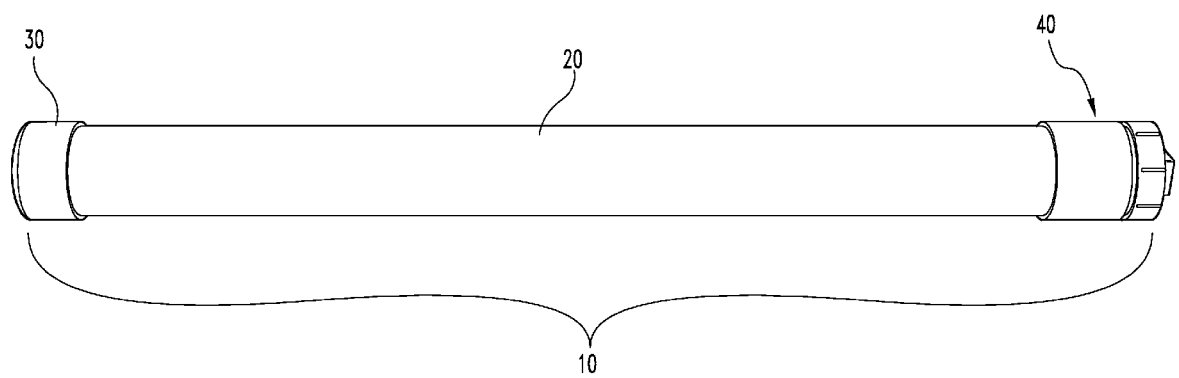
FIG. 1 is a front perspective view of a first embodiment of a truck bed ballast system.
Figure 2:
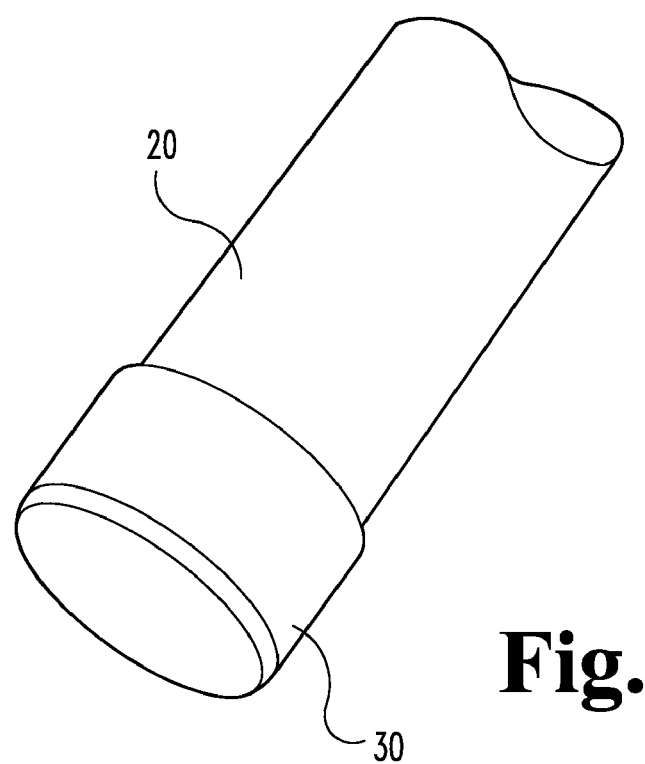
FIG. 2 is an enlarged partial view of one end of the first embodiment of the truck bed ballast system, as shown in FIG. 1.
Figure 3:
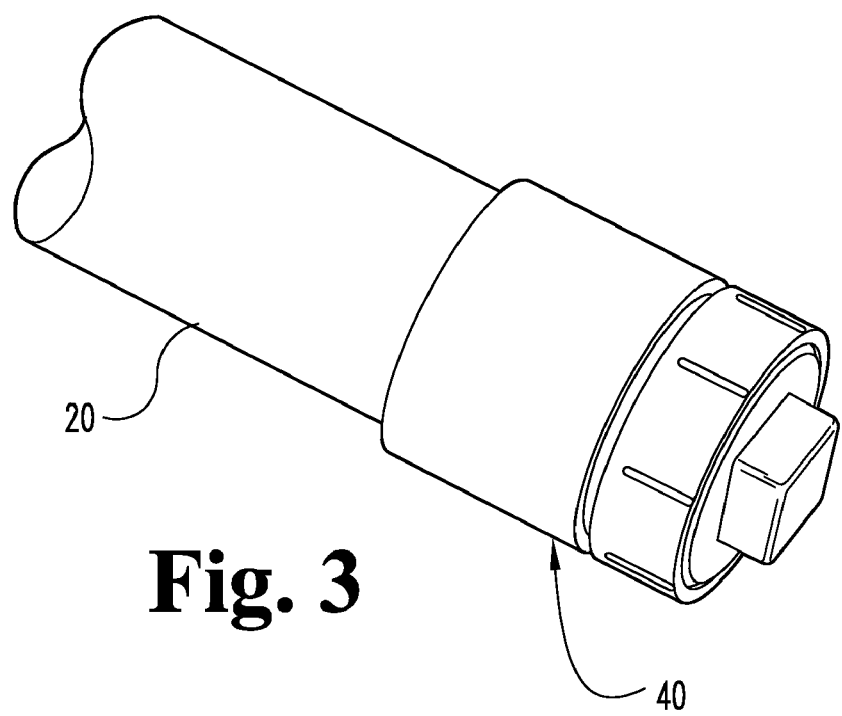
FIG. 3 is an enlarged partial view of a second end of the first embodiment of the truck bed ballast system, as shown in FIG. 1.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

Figure 4:
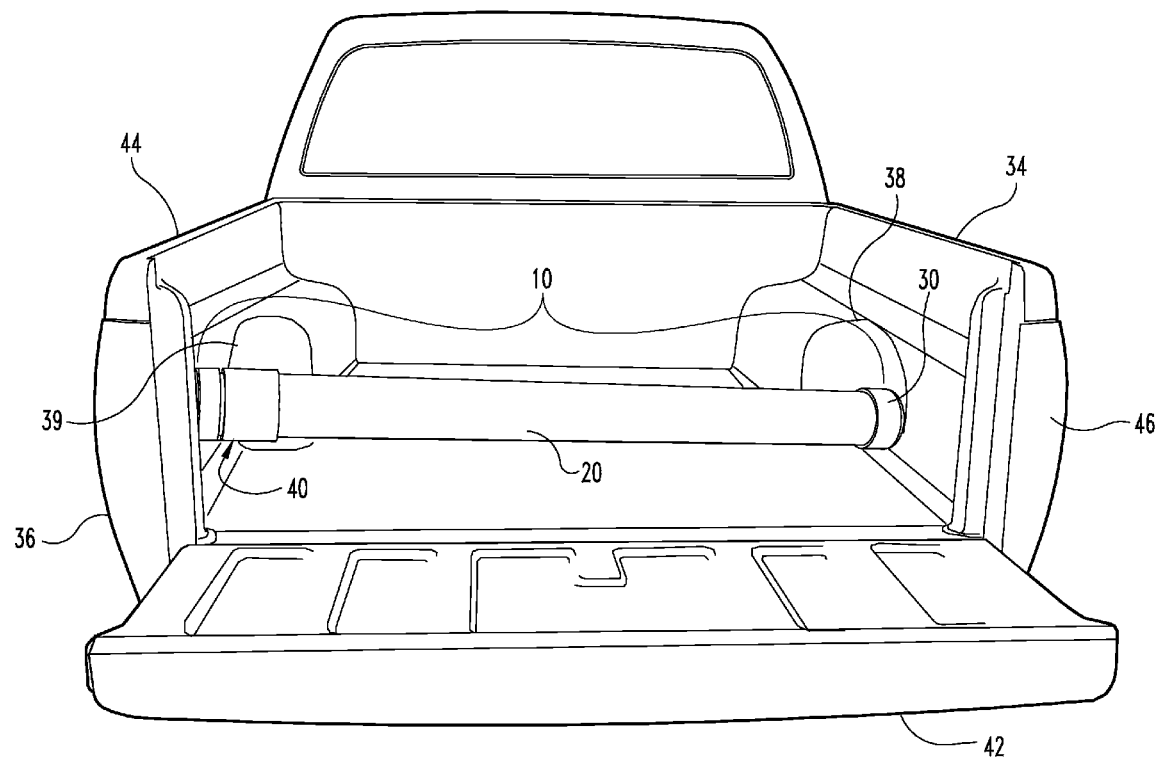
FIG. 4 is a front perspective view of the first embodiment of the truck bed ballast system, as shown in FIG. 1, within a truck bed.

FIGS. 1-4 illustrate a first embodiment of a truck bed ballast system 10 for providing incremental amounts of extra weight over the rear drive wheels of a pick-up truck that doubles as a storage container for traction-enhancing media, such as salt, sand, gravel, and the like. The system 10 includes a rigid, substantially non-flexible, elongated cylindrical body member 20 that is substantially permanently capped at one end 30 and may either be substantially permanently capped or removably and resealably capped at the other end 40 such as by a threaded end cap or other suitable means. Each cap 30, 40 typically has a planar surface generally perpendicular to and complimentary in shape with the inner peripheral surface of the elongated cylindrical body member 20 and is generally oriented parallel to the cross-section when engaged with the body member 20. The length of the cylindrical body member 20 (with end caps 30, 40) in this particular example is such that the capped member 20 fits across the bed portion 34 of a truck between the tailgate end of the truck bed 36 and the wheel well 38 as shown in FIG. 4. In one example, body member 20 is sized such that there is about ⅛ inch clearance between each end of the body member 20 and the sidewall 44 extending between the wheel well 38 and tailgate 42. In other examples, a cylindrical body member 20 is sized such that it fits across the bed of a truck between the first sidewall 44 and the second sidewall 46 having greater or less than ⅛ inch clearance. The cylindrical body member 20 may be filled with a substantially homogeneous mixture of sand, gravel, salt, or the like. The truck bed ballast system 10 allows for proper distribution of weight over the power driven wheels of a motor vehicle for improving traction and handling when disposed between the wheel well 38 and the tailgate 42 of the truck bed 34.

Figure 5:
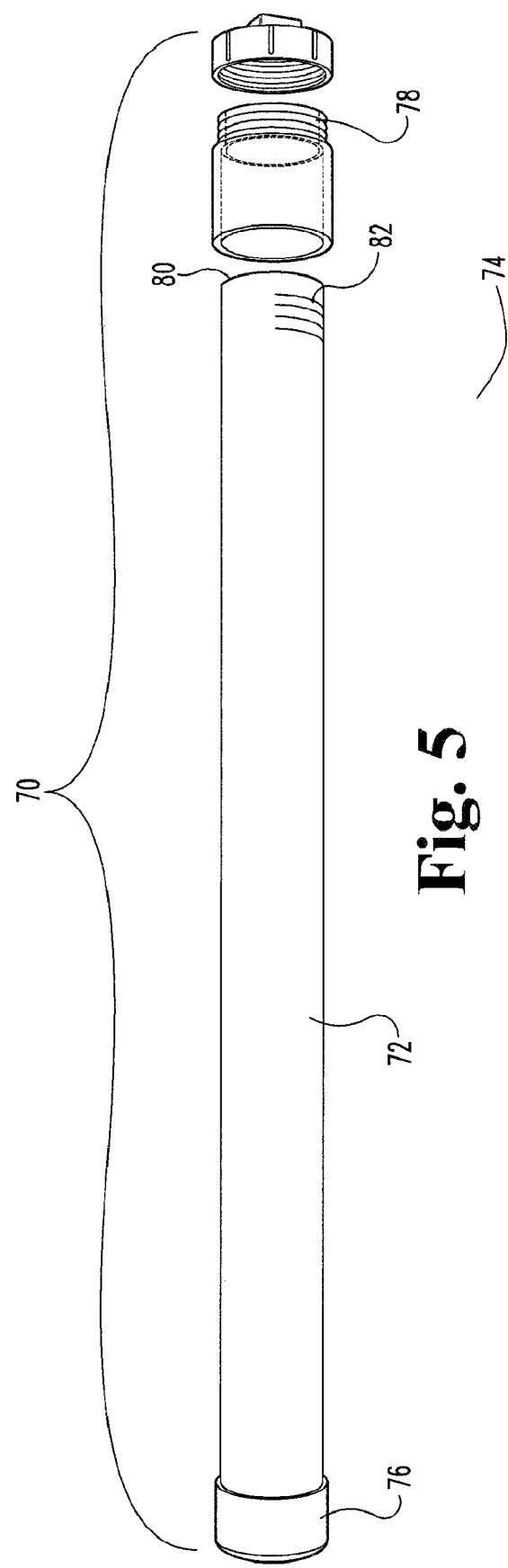
FIG. 5 is a front perspective view of a second embodiment of a truck bed ballast system.

In another embodiment, shown in FIG. 5, a ballast system 70 having a rigid, non-flexible, cylindrical body member 72 is contemplated as being provided as a kit 74. Kit 74 includes a permanently affixed endcap 76 and at least one removable endcap 78 which is threaded or otherwise removably fixed thereupon to the end opposite fixed cap 76. The end 80 of cylindrical body member 72 proximal to removable endcap 78 bears markings, scoring, or other indicia 82 to allow for cutting to predetermined lengths corresponding to the widths of common pickup truck makes and models and/or the distances between the sidewalls of various truck bed sizes in this particular example. In another example, endcap 78 is of a twist and lock nature, in which rotating endcap 78 in one direction will affix and lock endcap 78 to cylindrical body member 72, and rotating endcap 78 in the other direction will unlock and detach the endcap from cylindrical body member 72. Optionally, a blend of filler material 82 such as sand, salt, gravel, and the like is also provided for filling cylindrical body member 72 once it is cut to the desired length and threaded endcap 78 is fixed thereupon. The filler material 82 may be a substantially homogenous mixture of components such as sand, salt, gravel, and the like, or may be a heterogeneous mixture or single component as desired.

Figure 6:
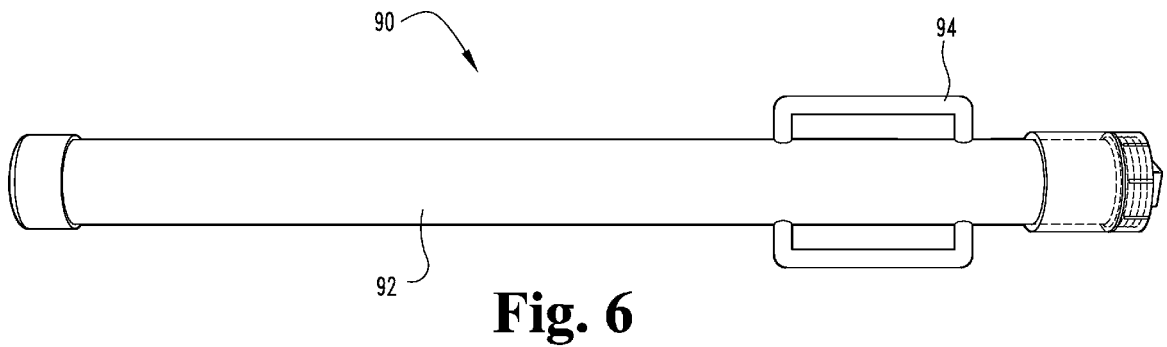
FIG. 6 is a top plan view of another embodiment of a truck bed ballast system.

Another example of a ballast system 90 is shown in FIG. 6. Cylindrical body member 92 is similar to body member 20 described above, but also includes a plurality of handle members 94 protruding from cylindrical body member 92. Handle members 94 are configured so as to provide stability to prevent cylindrical body member 92 from rolling in the truck bed as well as providing a convenient handle for lifting and carrying cylindrical body member 92. In another example, cylindrical body member 92 contains between thirty (30) and sixty (60) pounds of filler material, although ballast systems containing greater or lesser amounts of filler material are also contemplated.

Figure 7:
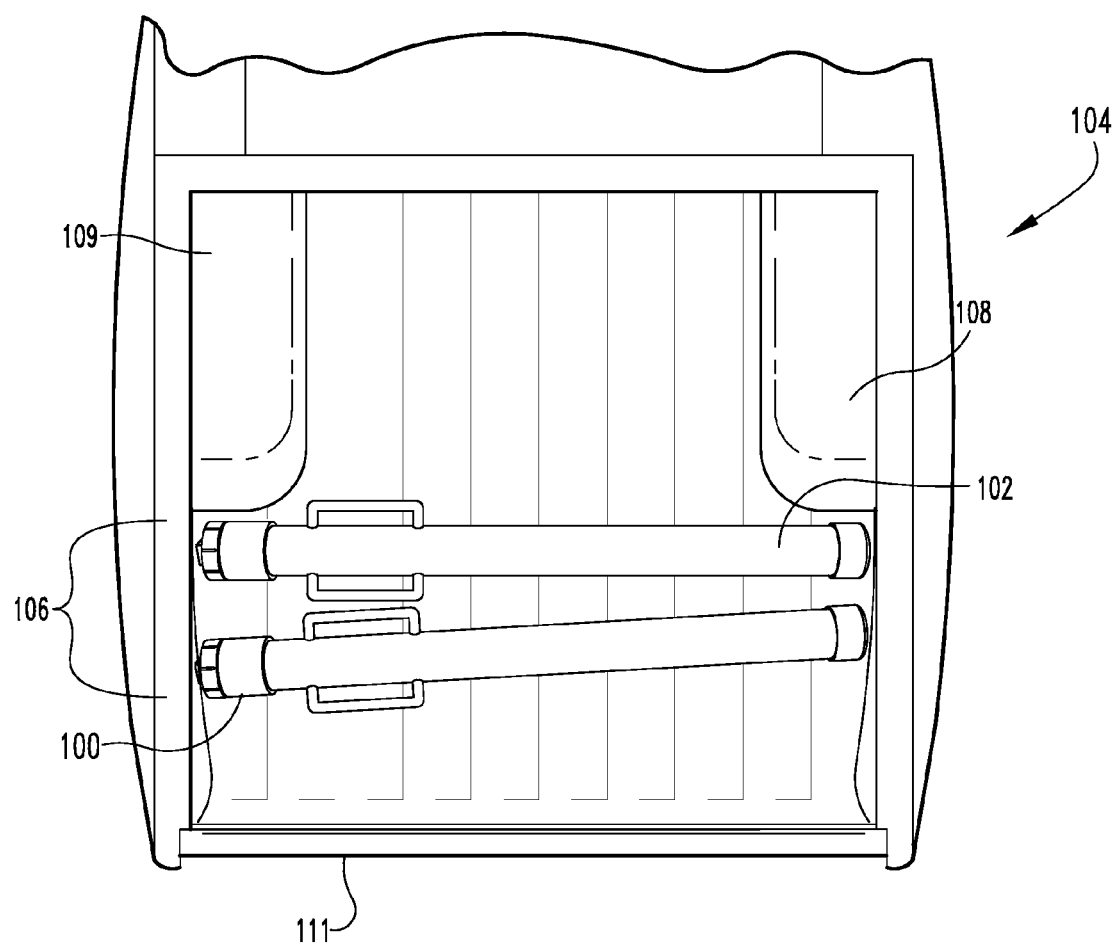
FIG. 7 is a top plan view of yet another embodiment of a truck bed ballast system.
Figure 8:
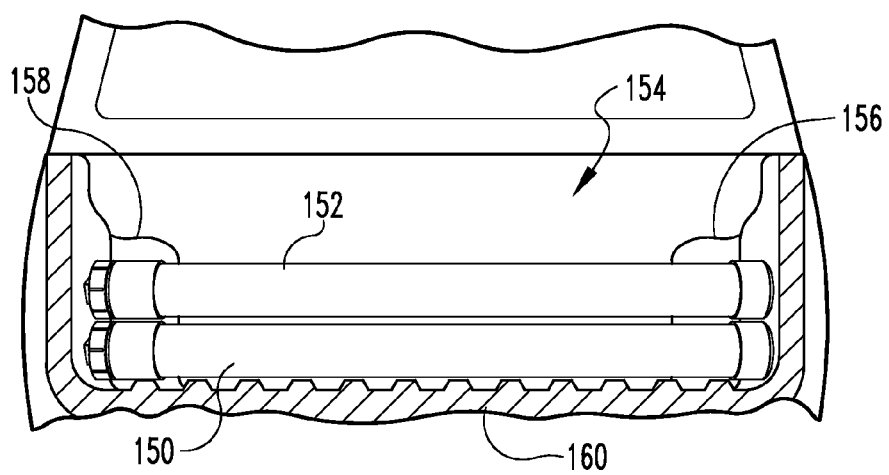
FIG. 8 is a front view of still another embodiment of a truck bed ballast system.

In still another example, at least one cylindrical body member 20 is positioned in the bed of a pickup truck that is expected to need extra traction (such as in icy weather) between the rear wheel wells and the tailgate such as shown in FIG. 4. Optionally, as shown in FIGS. 7-8, more than one cylindrical body member may be used. As shown in FIG. 7, two cylindrical body members 100, 102 are disposed in a truck bed 104 to provide extra weight for traction as well as to fill the space 106 between the wheel wells 108, 109 and the tailgate 111 sufficiently to eliminate shifting of the cylindrical body members 100, 102 during operation of the truck. If the truck were to lose traction and become stuck, despite the presence of the extra ballast weight, one or more cylindrical body members 100, 102 may be removed from the truck bed and their contents removed and applied under the drive wheels to enhance traction and assist the truck in becoming freed. As shown in FIG. 8, two cylindrical body members 150, 152 are disposed in a truck bed 154 between the wheel wells 156, 158 and the tailgate (removed for the sake of clarity). In this particular example, body members 150 and 152 are stacked vertically relative to the truck bed 160.

Figure 9:
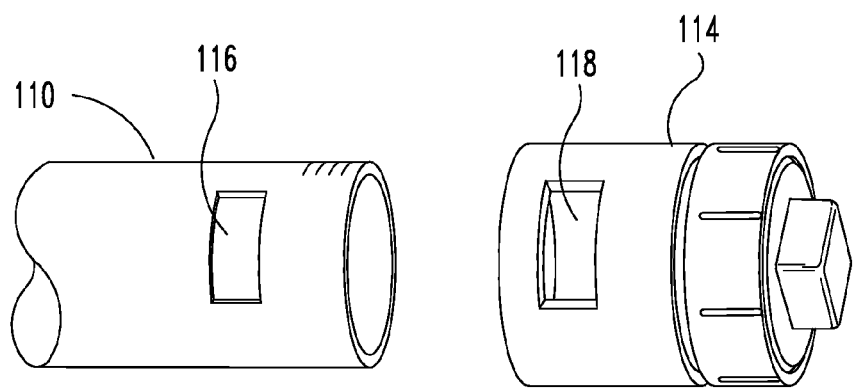
FIG. 9 is a partial view of one end of a truck bed ballast system.

In another embodiment, shown in FIG. 9, a cylindrical body member 110 is contemplated as having a removable endcap 114. The cylindrical body member 110 has an aperture 116 located near the end proximal to endcap 114. Endcap 114 has an aperture 118 of similar size and shape to the body member aperture 116. Endcap 114 is rotatably engaged with body member 110 such that when rotated to bring aperture 118 in register with body member aperture 116, an opening is formed, and the contents of the cylindrical body member 110 may be dispensed through said opening.

Figure 10:
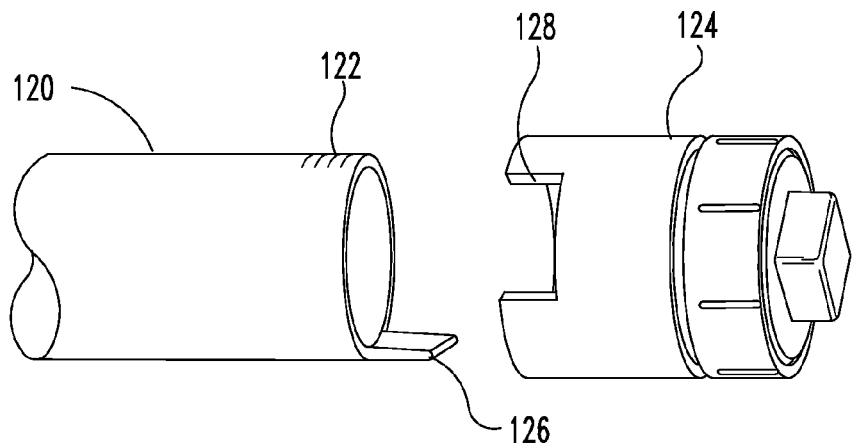
FIG. 10 is a partial view of one end of another truck bed ballast system.

In yet another embodiment, shown in FIG. 10, a cylindrical body member 120 is contemplated as having a removable endcap 124. Cylindrical body member 120 includes a spout 126 mounted to the end proximal to endcap 124. Endcap 124 includes an aperture 128 configured such that when endcap 124 is rotated so as to bring aperture 128 in register with spout 126, an opening is formed and contents of the cylindrical body member 110 may be dispensed through said opening and across spout 126.

Figure 11:
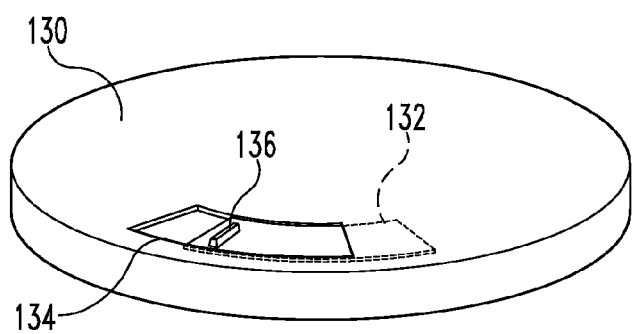
FIG. 11 is a partial view of one end of still another truck bed ballast system.

In another embodiment, shown in FIG. 11, a removable endcap 130 includes an opening 132 having a movable cover 134. Cover 134 is movable between a first position in which the opening 132 is unobstructed and a second position in which the cover 134 occludes the opening 132. In the unobstructed position, contents of a cylindrical body member capped by endcap 130 may be dispensed through said opening 132. A tab 136 may be mounted to the cover 134 to facilitate movement of the cover 134 between the first and second positions.

In one particular example, the truck bed ballast system 10 previously described is employed by removing the endcap and substantially filling body member 20 with a filler material 82 comprising a mixture of sand, gravel, and rock salt. Optionally, prior to the filling step body member 20 may be cut to a desired length. Once filled, endcap 40 is screwed into body member 20 thereby sealing the body member and preventing the filler material 82 from spilling out of the ballast system. The filled and sealed body member is then placed in the bed portion 34 of a truck where increased traction is desired.

Body member 20 is sized and configured such that when disposed within truck bed 34 between the wheel wells 38, 39 and the tailgate 42 there is a minimal clearance between the ends of body member 20 and sidewalls 44 and 46. In one example, there is no more than 1 inch between body member 20 and each sidewall 44, 46. In another example, there is no more than ⅛ inch between body member 20 and each sidewall 44, 46. In still another example, body member 20 has an overall length of no less than the distance between the first sidewall 44 and the second sidewall 46. Disposing the ballast system 10 between the wheel wells 38, 39 and the tailgate 42 distributes the majority of the ballast system's weight over the rear drive wheels of the truck. Additionally, sizing the body member 20 such that there is little room between the ends of the body member 20 and the truck sidewalls 44, 46 when the body member 20 is loaded in the truck bed 34 prevents the body member 20 from shifting when the truck is in motion.

Should the truck become stuck despite the increased weight provided by the loaded ballast system, the body member 20 is then either partially or completely removed from the truck bed 34. Removably mounted endcap 40 is then unscrewed so as to unseal body member 20. A desired amount of the filler material 82 may then be removed from the body member 20 and applied so as to assist in freeing the truck. For example, if the truck becomes stuck on ice, the filler material can be applied around the rear tires so as to increase traction. Optionally, the endcap 40 is then screwed back onto the body member to keep any remaining filler material from spilling and the body member is returned to the truck bed so as to increase the weight applied to the rear drive wheel prior to attempting to extricate the truck.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A method of increasing the traction of a vehicle having a bed portion including a first sidewall, a second sidewall, two wheel wells, and a tailgate, the method comprising:
   a) providing at least one substantially non-flexible cylindrical body member sized to substantially extend between the first sidewall and the second sidewall and having a first end substantially permanently capped by a fixed endcap and a second end removably and resealably capped by a removable endcap;
   b) providing a quantity of filler material;
   c) removing the removable endcap;
   d) substantially filling the cylindrical body member with the filler material;
   e) resealing the body member with the removable endcap; and
   f) disposing the body member in the vehicle bed between the wheel wells and the tailgate;
   g) at least partially removing the body member from the vehicle bed;
   h) removing the removable endcap;
   i) removing a portion of the filler material from the body member;
   j) applying the removed filler material so as to increase the traction of the vehicle;
   k) resealing the body member with the removable endcap; and
   l) redisposing the body member in the vehicle bed between the wheel wells and the tailgate;
   wherein the wheel wells engage the body member to define a maximum distance from the tailgate that the body member may move.

2. The method of claim 1 wherein the quantity of filler material includes at least one member of the group of sand, gravel, and salt.

3. A truck bed ballast system for use in a truck bed having a first sidewall, a second sidewall, two wheel wells, and a tailgate, comprising:
   at least one elongated, substantially non-flexible cylindrical body member having a first end and a second end;
   wherein the cylindrical body member is substantially permanently capped at the first end by a first cap;
   wherein the cylindrical body member is removably and resealably capped at the second end by a second cap;
   wherein the cylindrical body member is sized to substantially extend between the first sidewall and the second sidewall; and
   wherein the second cap is a threaded end cap.

4. A truck bed ballast system for use in a truck bed having a first sidewall, a second sidewall, two wheel wells, and a tailgate, comprising:
   at least one elongated, substantially non-flexible cylindrical body member having a first end and a second end;
   wherein the cylindrical body member is substantially permanently capped at the first end by a first cap;
   wherein the cylindrical body member is removably and resealably capped at the second end by a second cap;
   wherein the cylindrical body member is sized to substantially extend between the first sidewall and the second sidewall; and
   wherein the second end of the cylindrical body member is marked for cutting to predetermined lengths corresponding to the distances between the sidewalls of various models of trucks.

5. A truck bed ballast system for use in a truck bed having a first sidewall, a second sidewall, two wheel wells, and a tailgate, comprising:
   at least one elongated, substantially non-flexible cylindrical body member having a first end and a second end;
   wherein the cylindrical body member is substantially permanently capped at the first end by a first cap;
   wherein the cylindrical body member is removably and resealably capped at the second end by a second cap;
   wherein the cylindrical body member is sized to substantially extend between the first sidewall and the second sidewall; and
   wherein the cylindrical body member is sized such that it fits with approximately ⅛ inch clearance between the first end and the first sidewall and approximately ⅛ inch clearance between the second end and the second sidewall when the cylindrical body member is disposed between the wheel wells and the tailgate.

6. A truck bed ballast system truck bed ballast system for use in a truck bed having a first sidewall, a second sidewall, two wheel wells, and a tailgate, comprising:
   at least one elongated, substantially non-flexible cylindrical body member having a first end and a second end;
   wherein the cylindrical body member is substantially permanently capped at the first end by a first cap;
   wherein the cylindrical body member is removably and resealably capped at the second end by a second cap;
   wherein the cylindrical body member is sized to substantially extend between the first sidewall and the second sidewall;
   wherein the cylindrical body member contains a filler material; and
   wherein the filler material is a substantially homogeneous mixture of sand, salt, and gravel.

7. A truck bed ballast system kit for use in a truck bed having a first sidewall, a second sidewall, two wheel wells and a tailgate, comprising:
   at least one elongated non-flexible cylindrical body member having a first end and a second end;
   at least one removable endcap;
   a quantity of filler material;
   wherein the cylindrical body member is substantially permanently capped at the first end by a fixed endcap;
   wherein the cylindrical body member is removably and resealably capped at the second end by the removable endcap;
   wherein the cylindrical body member is sized to substantially extend between the first sidewall and the second sidewall; and
   wherein the at least one removable endcap includes a threaded end cap.

8. A truck bed ballast system kit for use in a truck bed having a first sidewall, a second sidewall, two wheel wells and a tailgate, comprising:
   at least one elongated non-flexible cylindrical body member having a first end and a second end;
   at least one removable endcap;
   a quantity of filler material;
   wherein the cylindrical body member is substantially permanently capped at the first end by a fixed endcap;
   wherein the cylindrical body member is removably and resealably capped at the second end by the removable endcap;
   wherein the cylindrical body member is sized to substantially extend between the first sidewall and the second sidewall; and wherein the second end of the cylindrical body member is marked for cuffing to predetermined lengths corresponding to the distances between the sidewalls of various models of trucks.

9. A truck bed ballast kit for use in a truck bed having a first sidewall, a second sidewall, two wheel wells and a tailgate, comprising:
- at least one elongated non-flexible cylindrical body member having a first end and a second end;
- at least one removable endcap;
- a quantity of filler material;
- wherein the cylindrical body member is substantially permanently capped at the first end by a fixed endcap;
- wherein the cylindrical body member is removably and resealably capped at the second end by the removable endcap;
- wherein the cylindrical body member is sized to substantially extend between the first sidewall and the second sidewall; and
- wherein the quantity of filler material is a substantially homogeneous mixture of sand, salt, and gravel.

10. The kit of claim 9, further comprising at least one handle member mounted to the at least one cylindrical body member.

11. The kit of claim 9, wherein the at least one removable endcap includes an opening and a cover movable between a first position and a second position;
- wherein the opening is occluded when the cover is in the first position and the opening is unobstructed when the cover is in the second position.

* * * * *